United States Patent [19]

Scheuer

[11] Patent Number: 4,912,809
[45] Date of Patent: Apr. 3, 1990

[54] TANDEM CONE BOLT ANCHOR MOUNTING ASSEMBLY

[75] Inventor: Nicholas G. Scheuer, Michigan City, Ind.

[73] Assignee: Kawneer Company, Inc., Norcross, Ga.

[21] Appl. No.: 690,603

[22] Filed: Jan. 11, 1985

[51] Int. Cl.$^4$ .............................................. A47B 95/02
[52] U.S. Cl. .................... 16/114 R; 16/124; 16/125; 16/DIG. 24; 16/DIG. 40; 411/424; 403/246; 403/362
[58] Field of Search ................. 16/111 R, 114 R, 121, 16/124, 125, DIG. 24, DIG. 30, DIG. 40; 411/378, 424; 403/246, 362, 405; 292/348, 350; 49/460

[56] References Cited

U.S. PATENT DOCUMENTS

| | | | |
|---|---|---|---|
| 2,016,610 | 10/1935 | Moeller | 411/424 |
| 2,024,071 | 12/1935 | Taylor et al. | 411/424 |
| 2,576,511 | 11/1951 | Jewett | 16/111 R X |
| 2,589,516 | 3/1952 | Stelzer | 16/114 R X |
| 3,017,657 | 1/1962 | Mills | 403/362 X |
| 3,152,818 | 10/1964 | Ivins | 411/378 X |
| 3,202,433 | 8/1965 | Davis | 403/362 X |
| 3,222,732 | 12/1965 | Miller | 16/111 R X |
| 4,112,811 | 9/1978 | King | 411/424 X |

FOREIGN PATENT DOCUMENTS 1352599  5/1974  United Kingdom ................ 411/424

*Primary Examiner*—Nicholas P. Godici
*Assistant Examiner*—Edward A. Brown
*Attorney, Agent, or Firm*—Jones, Askew & Lunsford

[57] ABSTRACT

The present invention comprises an improved mounting device incorporating two set screws acting upon two separate axially spaced-apart conical portions of an anchor bolt to produce a lateral "wedging" force which anchors the door handle securely in place against the door stile. The anchor bolt is secured in a hole drilled in the door by turning the threaded shank of the bolt into an internally-threaded rivet set into the hole. A door pull is inserted over the anchor bolt through a bore in the door pull, and a counter bore fits over the flange of the internally-threaded rivet to permit the door pull to bear directly against the door stile. As the two set screws are tightened into threaded holes in the bottom of the door pull, the beveled tips of the set screws bear on the conical surfaces of the anchor bolt, creating a lateral wedging force which moves the door pull toward and against the door stile.

15 Claims, 2 Drawing Sheets

4,912,809

TANDEM CONE BOLT ANCHOR MOUNTING ASSEMBLY

TECHNICAL FIELD

This invention relates generally to fastening devices, and more specifically to an improved device for mounting push/pull handles to doors.

BACKGROUND OF THE INVENTION

Devices for mounting handles to doors without the use of exposed fasteners are known to the art. A traditional method for installing numerous types of hardware but especially for securing a bent-bar push/pull handle is to mount the handle upon an anchor projecting perpendicularly from the surface of the door. The handle is secured to the anchor by a single set screw acting on a cone-shaped section of the anchor.

Hardware mounted to a door by this traditional method suffers from the problem of continuously loosening from its holding device and requires ongoing maintenance. The single set screw employed to secure the handle to the anchor provides a pivot point for the forces applied to the hardware as the handle is pushed and pulled. The pivot point translates the lateral force applied to the door handle into a rotational force upon the hardware about the set screw, generating a hardware wobble. In addition, the steel comprising the cone itself is not an infinitely hard material, thereby contributing to the overall problem.

Efforts have been made to correct this problem by securing the handle to the anchor using two opposing set screws acting upon the same cone. This arrangement affords little if any mechanical advantage, however, since two set screws bearing upon one anchor cone act as a single pivot point.

SUMMARY OF THE INVENTION

As will be seen, the present invention solves these and other problems associated with conventional methods for mounting door handles with anchors and set screws. Stated generally, the mounting device of the present invention employs an anchor with dual axially spaced-apart cones and two set screws, maximizing the separation of the cones to separate the pivot points, thereby cancelling the independent actions of the two rotational forces.

Stated somewhat more specifically, the present invention comprises an improved mounting device incorporating two set screws acting upon two separate axially spaced-apart conical portions of an anchor bolt to produce a lateral "wedging" force which anchors the door handle securely in place against the door stile. The anchor bolt is secured in a hole drilled in the door by turning the threaded shank of the bolt into an internally-threaded rivet set into the hole. A door pull is inserted over the anchor bolt through a bore in the door pull, and a counter bore fits over the flange of the internally-threaded rivet to permit the door pull to bear directly against the door stile. As the two set screws are tightened into threaded holes in the bottom of the door pull, the beveled tips of the set screws bear on the conical surfaces of the anchor bolt, creating a lateral wedging force which moves the door pull toward and against the door stile.

As a pushing or pulling force is applied to the bent-bar door handle, rotational forces are exerted about the points where the tips of the set screws bear against the anchor bolt cones. By providing a pair of axially spaced apart cones, instead of the single cone known to the prior art, the upward component of the rotational force about one cone substantially cancels the downward component of the rotational force about the other cone. Thus, the rotational forces or moments applied at the points where the set screws bear against the cones tend to offset each other, thereby avoiding the "hardware wobble" problem known to the prior art.

An alternate embodiment of this invention comprises a device for securing two door pulls on opposing sides of a door. This embodiment comprises a longer dual-cone anchor bolt which extends all the way through the door. The threaded shank of the anchor bolt is received by the threaded bore of a first door pull, and the first door pull is tightened on the anchor bolt until it bears firmly against the first door stile. A second door pull is inserted over the head of the anchor bolt projecting perpendicularly from the opposite side of the door through a smooth bore in the door pull, and two set screws are tightened into the bottom of the second door pull and against the cones of the anchor bolt to anchor the second door pull against the second door stile in the manner hereinbefore described.

Thus, it is an object of the present invention to provide an improved device for mounting hardware.

It is a further object of the present invention to provide a secure hardware mounting for push/pull door handles that will not loosen with use, yet will not require any exposed fastening devices.

It is yet another object of the present invention to provide a method for mounting door handles which will require a minimum of maintenance.

It is another object of this invention to provide an anchor for mounting door handles to doors which can be adapted for use either with a single door handle or with two door handles mounted on opposing sides of a door.

Other objects, features, and advantages of the present invention will become apparent upon reading the following specifications when taken in conjunction with the drawings and the appended claims.

DETAILED DESCRIPTION OF THE PREFERRED EMBODIMENTS

Figure 1:
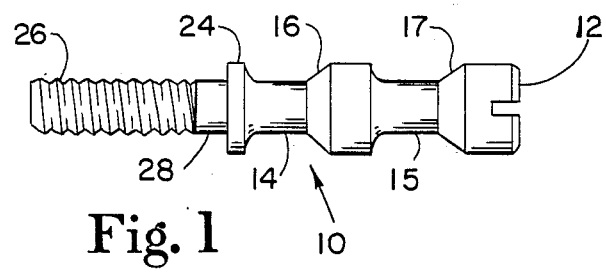
FIG. 1 is a side view of a tandem cone anchor bolt used in mounting a single bent bar door handle according to the preferred embodiment of the present invention.

Referring now in more detail to the drawings, in which like numerals indicate like elements throughout the several views, FIG. 1 shows a tandem cone anchor bolt, shown generally at 10, embodying the principles of the present invention. While the anchor bolt of the preferred embodiment is especially adapted to anchor a bent-bar push-pull door handle to a door stile, it will be appreciated that the present invention can be adapted to a wide variety of applications, such as securing other types of handles to a door or mounting hardware to windows.

The anchor bolt 10 includes a standard slot head 12 disposed at one end thereof to receive the blade of a conventional flat-head screwdriver. Other conventional configurations for receiving other torquing instruments for turning the anchor bolt may be alternatively incorporated, such as a "phillips" head, a "hex" head or an "allen" head, as may occur to those skilled in the art.

Anchor bolt 10 further includes two equal reductions 14, 15 and two axially spaced-apart frustoconic annular rings or cones 16, 17 disposed along the longitudinal axis of the anchor bolt, the conical surfaces of which are beveled to taper toward the door stile when the anchor bolt is installed as discussed below in connection with FIG. 2. Annular shoulder 24 serves a dual purpose: first, as a stabilizing bearing surface when the anchor bolt projects perpendicularly from the door stile, and second, as a guide to ensure that the cones are properly spaced in relation to the mounting surface. Behind the shoulder, the anchor bolt further includes threaded shank 26 and smooth shank 28.

Figure 2:
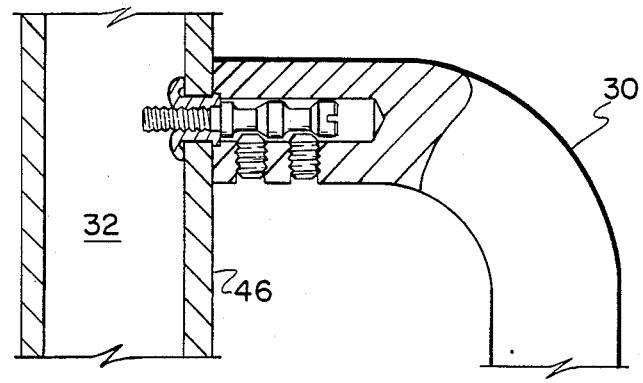
FIG. 2 is a side cross-sectional view of a single bent bar door handle mounted on a door by two of the tandem cone anchor bolts of FIG. 1.
Figure 2A:
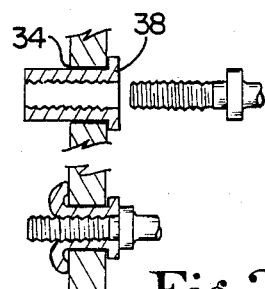
FIG. 2A is a side cross-sectional view of an internally-threaded rivet installed in a hole in a door for securing the anchor bolt of FIG. 1.
Figure 3:
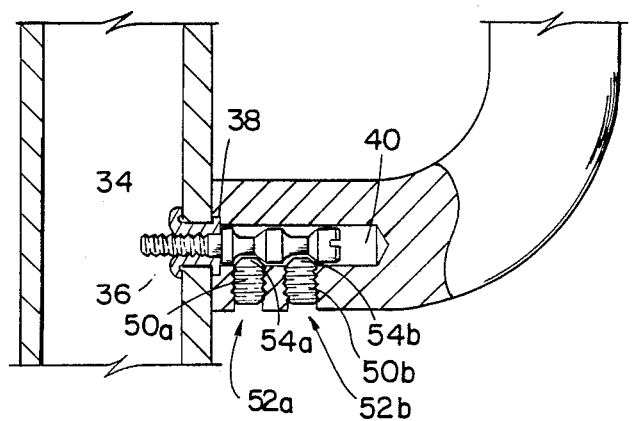
FIG. 3 is an enlarged partial view of a mounting arrangement shown in FIG. 2.
Figure 3:
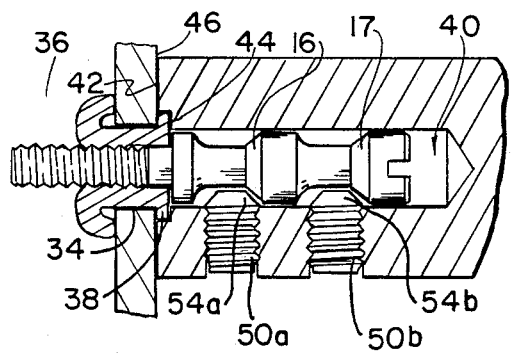

Referring now to FIGS. 2 and 3, a conventional bent bar door pull 30 is mounted to a door 32 by means of an anchor bolt 10 of the present invention. The anchor bolt is secured in a hole 34 drilled in the door by means of an internally-threaded rivet 36 commonly known to the art, as shown in FIG. 2A, which forms no part of the present invention. The rivet is inserted into the hole until the flange 38 of the rivet seats against the outer surface of the door stile, as shown in the upper diagram of FIG. 2A. A special rivet-setting tool known to the art is employed to set the rivet in the hole by collapsing the body of the rivet under compression against the inner surface of the door stile, as shown in the lower diagram of FIG. 2A. The threaded shank 26 of the anchor bolt is screwed into the internal threads of the rivet to secure the anchor bolt firmly in place. When anchor bolt 10 is fully inserted, shoulder 24 of the anchor bolt bears against the flange 38 of the rivet 36, which in turn bears against the door stile.

Door pull 30 is slipped onto the anchor 10 through a clear bore 40 drilled in the end 42 of the door pull. A counterbore 44 receives flange 38 of the rivet 36 to allow the end 42 of the door pull to bear directly against the door stile 46.

The door pull 30 is fastened to the anchor bolt 10 by two set screws 50a, 50b which are installed into threaded holes 52a, 52b disposed in the underside of the door pull so that the set screws are concealed from view. As the set screws are tightened into their threaded holes, the tips 54a, 54b of the set screws bear onto the conical surfaces of the frustoconic annular rings 16, 17 of the anchor bolt 10, exerting a wedging force which causes the door pull 30 to move laterally toward and against the door stile 46.

In order to most effectively translate the wedging force exerted by the set screws bearing on the conical surfaces of the frustoconic annular rings into a lateral force which moves the door pull toward and against the door stile, it has been found that the most efficient angle for the conical surfaces with respect to the longitudinal axis of the anchor bolt is approximately 45 degrees.

An essential element of the present invention is that the set screws bear onto two separate axially spaced-apart cones of the anchor bolt. When a pulling force is applied to the door handle, the lateral component of the pulling force exerts a rotational force about an axis of rotation along the line of contact between the point of the set screw and the point where the frustoconic annular ring contacts the bore wall at a point opposite the set screw. With only a single set screw and cone, if the door handle is not properly installed to urge the base of the handle tightly against the door panel, the handle would tend to wobble upon its mounting bolts about this axis of rotation in response to lateral loads as the door is opened or closed. Over a relatively short period of time, this "play" could lead to a loosening of the set screw such that the handle might become disengaged from the door. The addition of a second set screw mating upon a single cone does not completely solve this problem, since still only one point on the frustoconic annular ring contacts the bore wall, again providing a single pivot point about which the handle can "wobble".

However, the utilization of a second axially spaced apart cone provides a significant advantage over a single cone bolt anchor with respect to resisting handle wobble. Instead of a single line of contact from the tip of a set screw through the point where the cone contacts the bore wall, there are two such lines of contact. These two axes form a force couple in the bolt of a magnitude proportional to the distance between the set screws. This force couple offers a second resistance against lateral loads not found in a single cone bolt. Thus, even where the door handle is not properly installed, and even if the set screws are not completely tight, this force couple will resist lateral loads and prevent the handle from wobbling. Since the magnitude of the force couple is proportional to the distance between the set screws, the effectiveness of the couple can be increased by increasing the axial separation between the cones. From a practical perspective, however, the maximum separation between the cones is limited by the "stand-off" distance of the door handle to the door stile.

It will be understood that FIG. 2 depicts door pulls which are mounted to a door at top and bottom by identical arrangements. References in the disclosure to the lower fastening arrangement are therefore understood to refer to the upper fastening arrangement as well.

To install a single door pull using the fastening device of the present invention, a hole 34 of diameter slightly greater than the outer diameter of the internally-threaded rivet 36 is drilled into the door perpendicular to the surface of the door stile. The rivet is inserted into the hole as shown in the top portion of FIG. 2 until it seats on its flange 38. A special rivet-setting tool known to the art is used to collapse the body of the internally-threaded rivet under compression against the inside wall of the door 46. The anchor bolt 10 is then screwed into the rivet until the shoulder 24 bears against the flange 38 of the rivet 36, so that the portion of the anchor bolt comprising the cones and bolt head projects perpendicularly from the door stile surface.

Once the anchor bolt is secured in place in this manner, the door pull 30 is slipped over the projecting anchor bolt through the clear bore 40 in the end 42 of the door pull. Rivet flange 38 is received into the counterbore 44 of the door pull 30 so that the end of the door pull bears directly against the door stile. As set screws 50a, 50b are tightened into their threaded holes 52a, 52b, the beveled tips 54a, 54b of the set screws bear against conical surfaces 16, 17, thereby forcing the door pull laterally toward and against the door stile, securing the door pull firmly in place.

Figure 4:
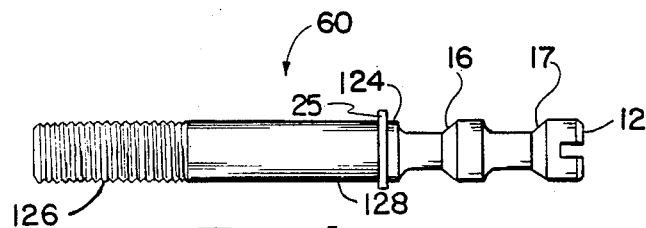
FIG. 4 is a side view of an alternate embodiment of a tandem cone anchor bolt used in mounting two bent bar door handles on opposing sides of a door.
Figure 5:
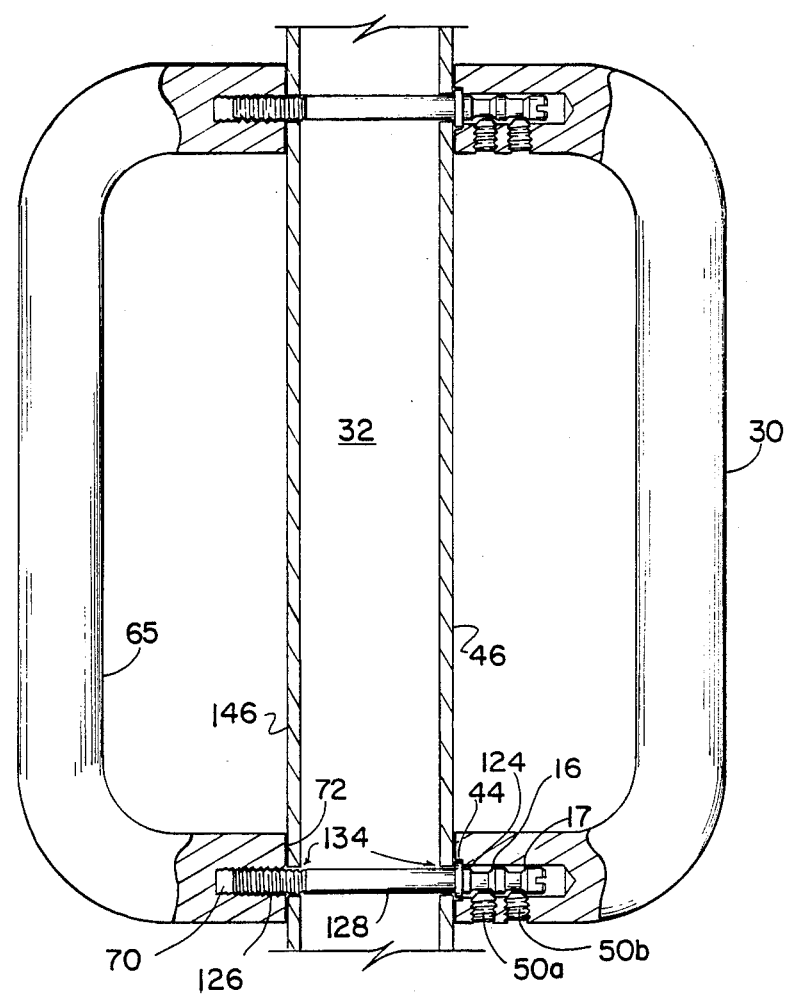
FIG. 5 is a side cross-sectional view of opposing bent bar door handles mounted on a door by two of the tandem cone anchor bolts of FIG. 4.

FIGS. 4 and 5 show an anchor bolt 60 used to mount front and back opposing door pulls 30, 65 on opposite sides of a door 32 according to an alternate embodiment of the present invention. Anchor bolt 60 comprises a slot head, reductions, and frustoconic rings, as previously disclosed. Threaded shank 126 and smooth shank 128 of anchor bolt 60 are longer than those of the single pull anchor bolt 30 to permit anchor bolt 60 to extend all the way through the door and project from the back door stile 146.

In the double-pull embodiment, the anchor bolt 60 is secured not to an internally-threaded rivet set in the door but to a threaded bore 70 in the end 72 of the back door pull 65. In order to compensate for the absence of the internally-threaded rivet, anchor bolt 60 includes several structural modifications over anchor bolt 10 of the single-pull embodiment. Since hole 134 extending through the door to receive anchor bolt 60 does not include the rivet required by the single door pull arrangement, the threaded shank 126 and smooth shank 128 of the anchor bolt 60 are of correspondingly larger diameter than those of anchor bolt 10 to fit the hole snugly and compensate for the absence of the rivet.

Further, where the shoulder 24 of the anchor bolt 10 of the single pull embodiment bears against the flange of the rivet, anchor bolt 60 bears directly against the surface of the door. Thus, to provide for the correct spacing of the cones from the surface of the front door stile, anchor bolt 60 includes an inner collar 125 adjacent to shoulder 124. Shoulder 124 is the same diameter and thickness as the shoulder 24 of anchor bolt 10, and the collar 25 is the same diameter and thickness as the flange 38 of the rivet 36. Thus, when the inner collar 25 of the anchor bolt 60 bears against the outer surface of the door stile, the frustoconic rings are disposed in the same relation to the outer surface of the door stile as those of anchor bolt 10 for the single pull embodiment.

Back door pull 65 comprises a threaded bore 70 in the end 72 of the door pull which receives the threaded shank 126 of the anchor bolt 60 extending through the door. Turning the anchor bolt tightens the back door pull 65 toward and against the back door stile 146, thereby fastening the back door pull in place and securing anchor bolt 65 in position to project perpendicularly from the front stile of the door. Front door pull 30 mounts to the front door stile over anchor bolt 65 as described above for the single door pull embodiment.

It will be understood that FIG. 5 depicts door pulls which are mounted to a door at top and bottom by identical arrangements. References in the disclosure to the lower fastening arrangement are therefore understood to refer to the upper fastening arrangement as well.

To install front and back opposing door pulls 30, 65 with the alternate embodiment of the fastening device of the present invention, a hole 134 is drilled completely through the door perpendicularly to the door stiles to accommodate anchor bolt 60. Since the double pull fastener does not utilize an internally-threaded rivet, the diameters of the threaded shank 126 and smooth shank 128 are correspondingly greater to fit the hole 134 snugly and compensate for the absence of an rivet. The anchor bolt is inserted into the hole from the front side of the door until collar 25 bears directly against the front door stile, so that the top portion of the anchor bolt comprising the cones and bolt head projects perpendicularly from the front door stile, while the threaded shank 126 projects through the opposite door stile.

Threaded bore 70 in the end 72 of the back door pull 65 receives the threaded shank 126 of the anchor bolt. As the anchor bolt is turned, the back door pull is tightened against the back door stile, fastening the door pull in place and securing the anchor bolt in position. The front door pull is then slipped over the anchor bolt through the clear bore 40 in the end 42 of the door pull. Inner collar 125 is received into the counterbore 44 of the door pull 30 so that the end of the door pull bears directly against the surface of the front door stile. The set screws are then tightened to secure the front door pull against the surface of the door stile as hereinbefore described.

While the foregoing disclosure relates specifically to mounting a bent bar door pull to a door, it should be understood that the disclosed fastening device can be adapted to a variety of uses wherein a workpiece is being mounted to a mounting surface.

It will be appreciated by those skilled in the art that set screws with conical tips may be utilized in place of beveled tipped set screws 50 to secure the door pulls to the door. Set screws with conical tips provide the advantage of a somewhat greater bearing surface against the conical surfaces of the annular rings 16, 17 of the anchor bolt 10. However, in order to effectively translate the vertical force applied by the set screw into a horizontal force urging the door handle against the door stile, the set screws must bear against the cones and not against the shaft of the anchor bolt. A beveled tipped set screw thus affords a greater margin for adjustment before the tip of the set screw contacts the shaft of the bolt.

Finally, it will be understood that the preferred embodiment of the present invention has been disclosed by way of example, and that other modifications may occur to those skilled in the art without departing from the scope and spirit of the appended claims.

What is claimed is:
1. An apparatus for mounting a push/pull door handle to the stile of a door, comprising:
(1) an anchor bolt, said anchor bolt comprising:
   a shaft, including a head at one end of said shaft and a threaded shank at the other end;
   a first frustoconic annular ring, coaxially disposed on said shaft proximate to said head of said shaft; and
   a second frustoconic annular ring, coaxially disposed on said shaft in spaced apart relation to said first frustoconic annular ring;
   said first and second frustoconic annular rings being aligned with their larger bases facing said head of said shaft;
   said threaded shank of said anchor bolt being turned into the door with said shaft comprising said head and said frustoconic annular rings projecting a distance from the door stile in a substantially perpendicular manner;
(2) a door handle having a bore therein, said shaft of said anchor bolt comprising said head add said frustoconic annular rings being received within said bore; and (3) tightening means associated with said door handle for transversely bearing against the conical surfaces of said frustoconic annular rings such that the conical surfaces of said frustoconic annular rings translate the transverse force exerted by said tightening means into a longitudinal force urging said door handle toward and against the door stile.

2. The device according to claim 1, wherein the conical surfaces of said frustoconic annular rings form an angle of about 45 degrees with the longitudinal axis of said shaft.

3. The apparatus of claim 1, further comprising:
an annular collar axially disposed on said shaft of said anchor bolt between said second frustoconic annular ring and said threaded shank and received within said bore in said door handle;
whereby said annular collar bears against the door stile to dispose said first and second frustoconic annular rings in spaced apart relation to the door stile.

4. An apparatus for anchoring first and second push-/pull door handles to opposing stiles of a door, comprising:
(1) an anchor bolt, said anchor bolt comprising: a shaft, including a head at one end of said shaft and a threaded shank at the other end; a first frustoconic annular ring, coaxially disposed on said shaft proximate to said head of said shaft; and
a second frustoconic annular ring, coaxially disposed on said shaft in spaced apart relation to said first frustoconic annular ring;
said first and second frustoconic annular rings being aligned with their larger bases facing said head of said shaft;
an annular collar axially disposed on said shaft between said second frustoconic annular ring and said threaded shank,
said shank of said anchor bolt being inserted through the door with said threaded shank projected from the first door stile surface, and said collar bearing against the second door stile surface with said shaft above said collar comprising said head and said frustoconic annular rings projecting a distance from the second door stile surface in a substantially perpendicular manner;
(2) a first door handle having a threaded bore therein, wherein said threaded bore matingly receives said threaded shank of said anchor bolt to secure said first door handle against the first door stile surface;
(3) a second door handle having a bore therein, said shaft of said anchor bolt comprising said head and said frustoconic annular rings being received within said bore; and
(4) tightening means associated with said second door handle for transversely bearing against the conical surfaces of said frustoconic annular rings such that the conical surfaces of said frustoconic annular rings translate the transverse force exerted by said tightening means into a longitudinal force urging said second door handle toward and against the second door stile surface;

5. The device according to claim 4, wherein the conical surfaces of said frustoconic annular rings form an angle of about 45 degrees with the longitudinal axis of said shaft.

6. A device for securing a workpiece to a mounting surface, comprising:
an elongate member;
means defining a pair of axially spaced-apart surfaces extending from said elongate member in acute angular relation to the longitudinal axis thereof;
means selectively operative for securing said elongate member to the mounting surface to project therefrom in a substantially perpendicular manner, whereby said elongate member is received within a bore of the workpiece; and
mating members on the workpiece selectively bearing against said pair of axially spaced-apart surfaces in an angular direction,
whereby the workpiece is urged toward and against the mounting surface to secure the workpiece to the mounting surface, and
whereby the moment created by a pushing or pulling force exerted on said workpiece about the point at which one of said mating members bears against the first angular surface is substantially offset by the moment created about the point at which another of said mating members bears against the second angular surface.

7. The device according to claim 6, wherein said elongate member comprises a bolt, and wherein said axially spaced-apart surfaces comprise axially spaced-apart frustoconic annular rings.

8. The device according to claim 6, further comprising an annular flange disposed along the longitudinal axis of said elongate member to bear against the mounting surface, whereby said axially spaced-apart angular surfaces are properly spaced-apart from the mounting surface.

9. The apparatus of claim 6, wherein the acute angular relation between said axially spaced-apart surfaces and the longitudinal axis of said elongate member is about 45 degrees.

10. The apparatus of claim 6, wherein said mating members associated with the workpiece for bearing against said axially spaced-apart surfaces comprises a plurality of set screws.

11. A device for securing a first workpiece and a second workpiece to opposing first and second faces of a mounting piece, wherein the mounting piece comprises a bore through both faces thereof, said securing device comprising:
an elongate member comprising a head, a tip, and a shank, said elongate member being selectably insertable into the bore through the first face of the mounting piece whereby said tip of said elongate member extends through the mounting piece to project from the second face and said head of said elongate member projects from the first face;
means disposed along said shank of said elongate member projecting from the first face of the mounting piece defining a pair of axially spaced-apart surfaces extending from said shank of said elongate member in acute angular relation to the longitudinal axis thereof; and
means disposed at said tip of said elongate member selectively operative to secure said elongate member to the second workpiece and effective to dispose the opposite end of said elongate member to project from the first face of the mounting piece in a substantially perpendicular manner, whereby said opposite end of said elongate member is received within a bore of the first workpiece, and mating members on the first workpiece selectively bearing against said pair of axially spaced-apart surfaces in an angular direction, whereby the first workpiece is urged toward and against the mounting surface to secure the workpiece to the first face of the mounting piece;

wherein the moment created by a pushing or pulling force exerted on said workpieces about the point at which one of said mating members bears against the first angular surface is substantially offset by the moment created about the point at which another of said mating members bears against the second angular surface.

12. The device according to claim 11, wherein said elongate member comprises a bolt, and wherein said axially spaced-apart surfaces comprise axially spaced-apart frustoconic annular rings.

13. The device according to claim 11, further comprising an annular flange disposed along the longitudinal axis of said elongate member to bear against the first face of the mounting surface, whereby said axially spaced-apart surfaces are properly disposed in relation to said first face.

14. The device according to claim 11, wherein the acute angular relation between said axially spaced-apart surfaces and the longitudinal axis of said elongate member is about 45 degrees.

15. The apparatus of claim 1, wherein said mating members on the first workpiece selectively bearing against said pair of axially spaced-apart surfaces in an angular direction comprise a plurality of set screws.

* * * * *